(No Model.)
T. J. SKINNER.
TIRE HEATER.
No. 489,042. Patented Jan. 3, 1893.
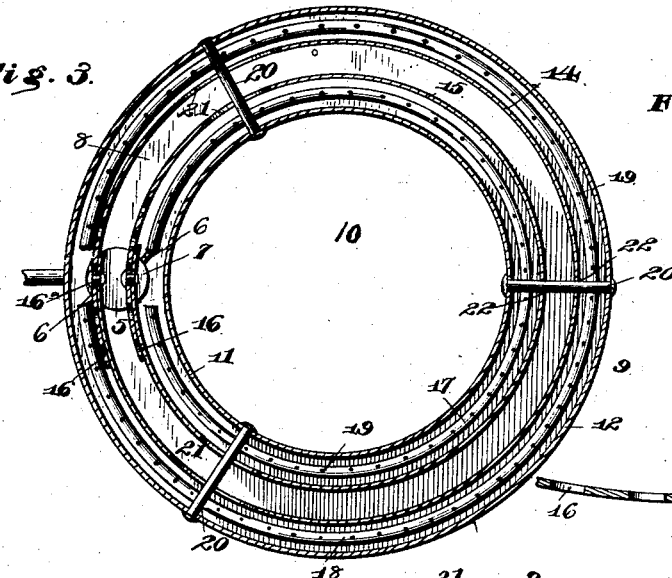
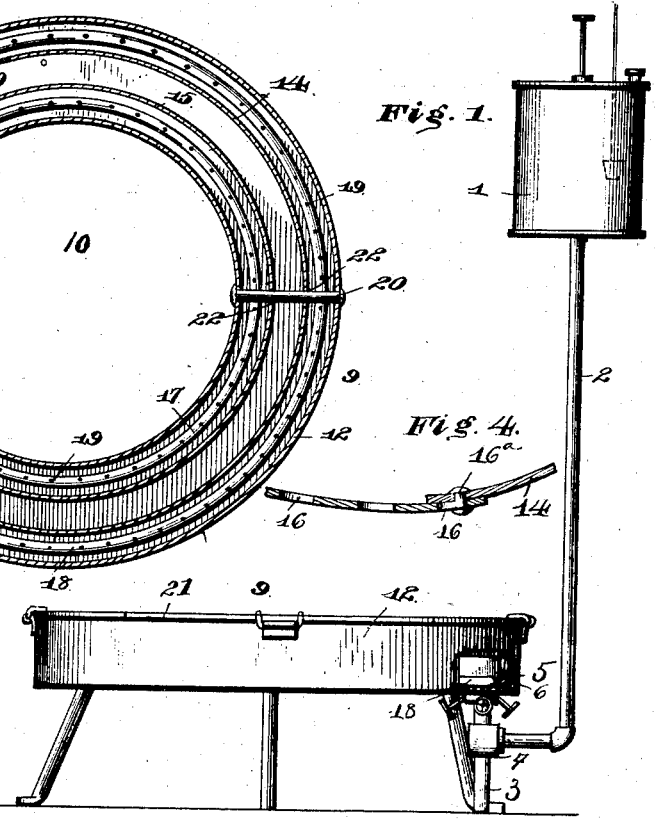
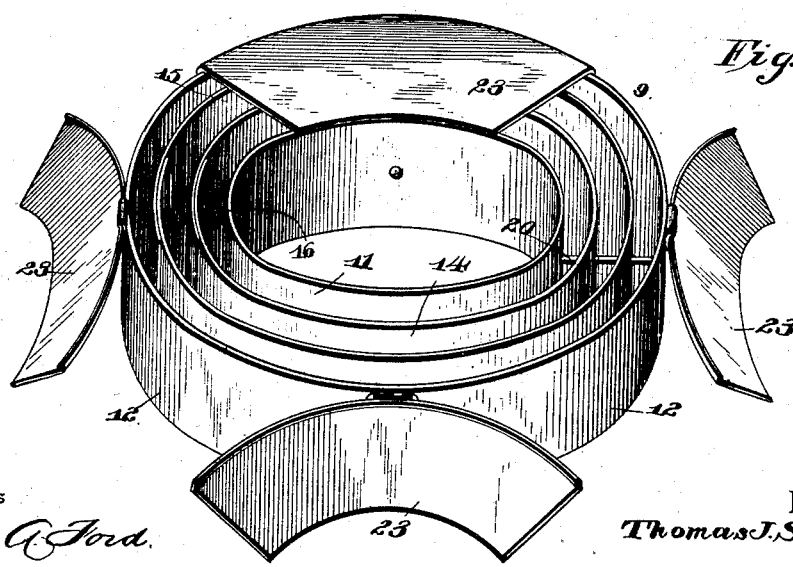
Witnesses
Chas. A. Ford.
Chas. S. Hyer.
Inventor
Thomas J. Skinner.
By his Attorneys,
C. A. Snow & Co.

UNITED STATES PATENT OFFICE.

THOMAS J. SKINNER, OF AUBURN, ASSIGNOR OF ONE-HALF TO JAMES A. REYNOLDS, OF CARROLL, IOWA.

TIRE-HEATER.

SPECIFICATION forming part of Letters Patent No. 489,042, dated January 3, 1893.

Application filed June 3, 1892. Serial No. 435,431. (No model.)

*To all whom it may concern:*

Be it known that I, THOMAS J. SKINNER, a citizen of the United States, residing at Auburn, in the county of Sac and State of Iowa, have invented a new and useful Tire-Heater, of which the following is a specification.

This invention relates to certain new and useful improvements in tire heaters and consists of the novel construction and arrangement of parts thereof as will be more fully hereinafter described and claimed.

The object of this invention is to provide simple and convenient means, whereby a number of tires may be heated at one and the same time and the parts of the same adjustable to the size of the tires and also automatically adjustable when expanded by the heat and wherein a small amount of heat will be required to perform a large amount of work thereby saving fuel labor and expense.

In the drawings;—Figure 1 is an elevation of the improved tire heater together with the fuel supply and mechanism in connection therewith. Fig. 2 is a detail perspective view of the tire heater proper. Fig. 3 is a central horizontal section. Fig. 4 is a detail perspective view of a portion of the device showing the means and manner of adjusting the partitions.

Similar numerals of reference are employed to indicate corresponding parts in the several views.

Referring to the drawings the numeral 1 designates an oil tank which is adapted to be supplied with a suitable gage and other attachments necessary for such devices and has a feed pipe 2 leading from the bottom thereof which is connected with a short vertically disposed pipe 3, having a lower closed end, by a T-connection 4. At the upper end of the pipe 3 is arranged a suitable generator 5, having supply teats or nipples 6, which enters through an opening 7 in the closed bottom portion 8 of the box or casing 9, of the tire heater. The tire heater is of annular form and has a central opening 10 with an interior flange 11 vertically surrounding the same and between said interior flange 11 and an outer flange 12, is located the closed bottom 8. Between said interior flange 11 and outer flange 12 are loosely mounted adjustable partitions 14 and 15 which have one end of each of the same provided with a series of openings 16 and the opposite end of each formed with or having attached thereto a headed stud or pin 16ª. By this means the said partitions may be adjusted circumferentially and between the same and the flanges 11 and 12 are arranged coiled pipes 17 and 18, which have a series of openings 19 therein on the upper sides of the same. These pipes are coiled in circular form to adapt the same to conform with the circular form of the tire heater and the ends of the same engage the teats or nipples 6 to receive the gas therefrom. A series of horizontally and radially disposed rods 20 extend from the outer flange 12 to the inner flange 11 and at certain points the partitions 13 and 14 are provided with horizontally disposed elongated slots 21 which are adapted to permit the said partitions to have free adjustment circumferentially either when adjusted by hand or through the medium of expansion arising from the heat. One of the said rods, 20, passes through openings 22 in the said partitions to hold the same in proper position within the space between the flanges 11 and 12 and prevent said partitions from being moved bodily around in the heater. The said rods 20 are primarily supplied for the purpose of supporting the tires placed within the device at a suitable distance above the pipes 17 and 18. When the tires are suitably positioned in the heater they are covered by segmental lids 23 which are hinged to the outer flange 11 and are of the same width as the distance between the flanges 11 and 12. When the tires have been properly placed within the heater over the coils of pipe 17 and 18 the said lids or covers 23 are closed down thereover and thereby confine the heat within the heater and materially assist in the heating operation. It will be understood that before the tires are positioned as set forth the openings 19 in the pipes 17 and 18 will have been supplied with a lighting device which is passed thereover to ignite the gas escaping therethrough and which will be supplied to the said pipes from the generator aforesaid.

The device herein set forth will more rapidly heat the tires than in previous devices of the same nature with a great saving in fuel and a reduction of expense of labor and time. The adjustable feature of the parts mentioned is also a very convenient and valuable accessory as will be readily understood by those skilled in the art.

Having now described my invention what I claim and desire to secure by Letters Patent is:—

1. In a tire heater, the combination of a box or casing and adjustable concentric partitions mounted therein, said partitions being constructed to be increased or decreased in diameter within the said box or casing, and a burner extending into the box or casing from the bottom of one side thereof, substantially as described.

2. In a tire heater, the combination of a box or casing having a perforated fuel pipe in the lower portion thereof to form a heating medium, and concentric partitions adjustably mounted in said box or casing, said partitions being constructed to be increased or decreased in diameter within said box or casing, substantially as described.

3. In a tire heater, the combination of a box or casing having lids or covers of segmental form, fuel pipes mounted in the bottom thereof and having openings therein, horizontally-disposed radially-arranged rods above said pipes, and concentric adjustable partitions between which said pipes are located, said partitions being freely movable on a part of said rods and constructed to be increased or decreased in diameter, substantially as described.

4. In a tire heater, the combination of a box or casing having lids or covers perforated fuel pipes in the bottom thereof horizontally disposed radially arranged rods, and partitions adjustably mounted in said box or casing and having slots therein adapted to be located over a portion of the said rods, said partitions having overlapping ends, a portion of which are provided with slots to engage headed pins carried by the other portion of the same, substantially as described.

5. In a tire heater the combination of an oil tank, a generator connected thereto a box or casing into which said generator extends and having a closed bottom pipe mounted on said bottom and connected with said generator, a series of horizontally arranged radially disposed rods and adjustable partitions mounted in said box or casing, said pipes being formed with openings for the escape of gas therethrough and the box or casing having hinged lids or covers, said partitions having overlapping ends, a portion of which are provided with openings or slots to engage headed pins carried by the other portion of the same, substantially as set forth.

In testimony that I claim the foregoing as my own I have hereto affixed my signature in the presence of two witnesses.

THOMAS J. SKINNER.

Witnesses:
G. M. PARKER,
J. F. HILLIARD.